United States Patent
Rengshausen

[11] Patent Number: 6,058,774
[45] Date of Patent: May 9, 2000

[54] DEVICE FOR DETECTING FLOW OF A FLUID INCLUDING A TEMPERATURE MEASURING INSTRUMENT

[75] Inventor: Detlef Rengshausen, Dassel-Amelsen, Germany

[73] Assignee: Trilog Thermotechnik GmbH, Dassel-Amelsen, Germany

[21] Appl. No.: 09/288,970

[22] Filed: Apr. 9, 1999

Related U.S. Application Data

[63] Continuation of application No. 08/869,432, Jun. 5, 1997.

[30] Foreign Application Priority Data

Jun. 10, 1996 [DE] Germany .......................... 196 23 174

[51] Int. Cl.[7] ................................. G01F 1/68; G01K 7/00
[52] U.S. Cl. ....................................... 73/204.24; 374/179
[58] Field of Search ........................ 73/204.24, 204.23, 73/148, 179; 374/205, 182

[56] References Cited

U.S. PATENT DOCUMENTS

| | | | |
|---|---|---|---|
| 3,030,806 | 4/1962 | Davis | 73/204.24 |
| 3,071,520 | 1/1963 | Smalling | 73/204.24 |
| 4,587,843 | 5/1986 | Tokura et al. . | |
| 4,848,147 | 7/1989 | Bailey et al. | 73/204.24 |
| 5,119,674 | 6/1992 | Neilsen | 73/204.24 |

FOREIGN PATENT DOCUMENTS

| | | |
|---|---|---|
| 0 313 120 | 4/1998 | European Pat. Off. . |
| 37 41 896 | 6/1989 | Germany . |
| 37 41 972 | 6/1989 | Germany . |
| 40 24 827 | 2/1991 | Germany . |
| 40 04 513 | 8/1991 | Germany . |
| 42 43 573 | 6/1994 | Germany . |
| 43 35 332 | 4/1995 | Germany . |
| 44 04 395 | 8/1995 | Germany . |
| 0012510 | 2/1981 | Japan . |
| 601298 | 5/1948 | United Kingdom . |
| 729180 | 3/1953 | United Kingdom . |
| 767 569 | 2/1957 | United Kingdom . |
| 1 230 638 | 5/1971 | United Kingdom . |
| 2 314 165 | 12/1997 | United Kingdom . |
| WO 89/11083 | 11/1989 | WIPO . |

OTHER PUBLICATIONS

Eujen, Dr. Ing. E., *Messung kleiner Flüssigkeitsgeschwindigkeiten nach dem Abkühlungsprinzip*, Archiv Für Technishces Messen, v. 144–1. (translation attached), Jan. 1950.

Schald, D., *Ünersicht zur Thermometrie mit Thermoelementen*, MSR, v. 27, pp. 306–308.

*Primary Examiner*—Harshad Patel
*Attorney, Agent, or Firm*—Merchant & Gould P.C.

[57] ABSTRACT

The invention relates to a device for detecting flow of a fluid, having a temperature measuring instrument (4), which comprises at least a first and a second temperature measuring point (P1 and P2), and a heating element (20), which is disposed substantially in the direction of flow of the fluid between the first and the second temperature measuring point (P1 and P2). The special feature of the invention lies in that the temperature measuring instrument (4) comprises a thermoelement (6) which consists of two wires (8, 10) of different materials, which are conductively connected to one another at a first end (12) and by their second ends (13, 14) are connected to an evaluation device (18), with the first end (12) of the thermoelement (6) forming the first temperature measuring point (P1) and at least one second end (13) of the thermoelement (6) forming the second temperature measuring point (P2).

14 Claims, 1 Drawing Sheet

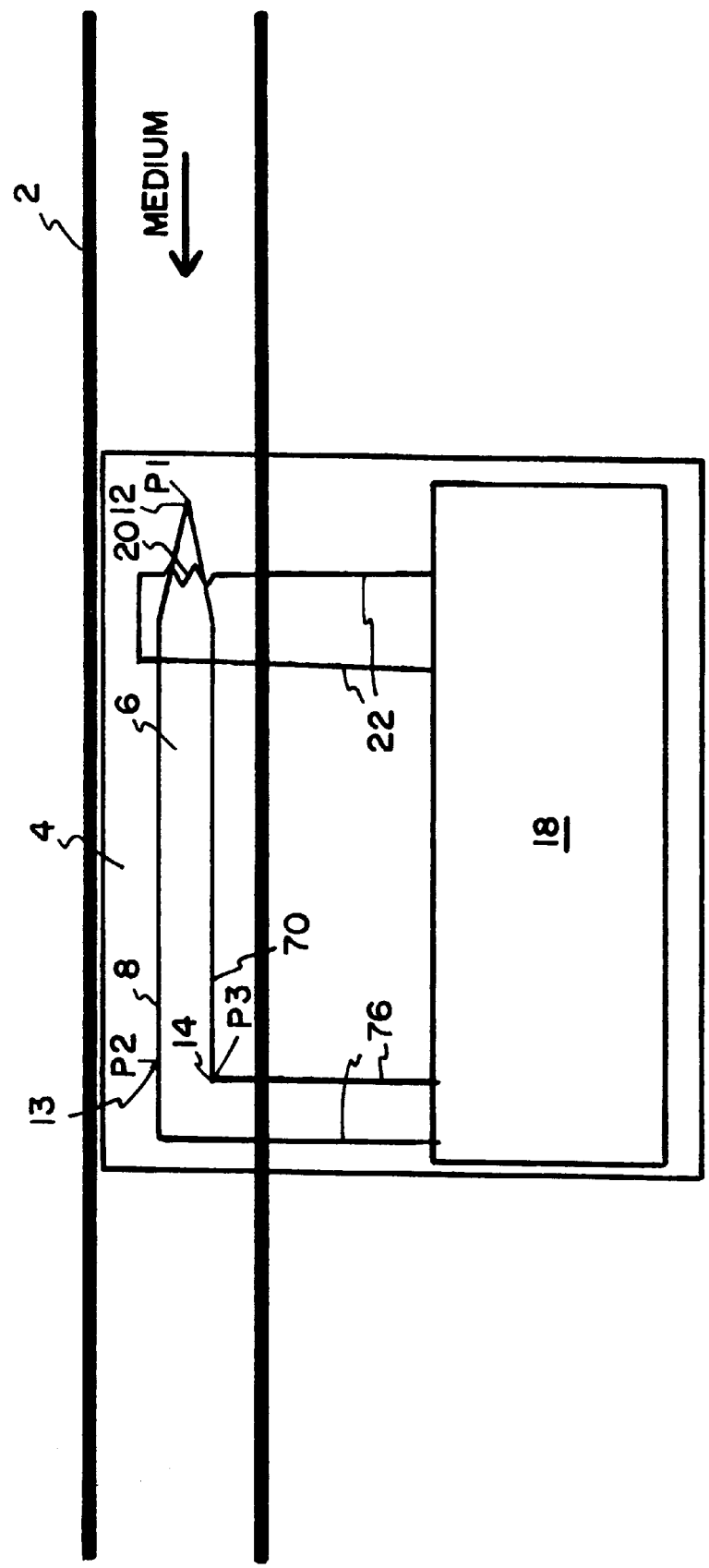

DEVICE FOR DETECTING FLOW OF A FLUID INCLUDING A TEMPERATURE MEASURING INSTRUMENT

This application is a Continuation of application Ser. No. 08/869,432, filed Jun. 5, 1997, which application is incorporated herein by reference.

The invention relates to a device for detecting a fluid or gaseous medium, having a temperature measuring instrument, which comprises at least a first and a second temperature measuring point, and a heating element, which is disposed essentially in the direction of flow of the medium between the first and the second temperature measuring point.

With such a device it is possible to ascertain whether, in which direction and at what velocity the medium is flowing. If, for example, the medium is flowing in the direction from the first to the second temperature measuring point, the heat generated by the heating element is transported to the second temperature measuring point, so that at said point the temperature correspondingly rises, whereas at the first temperature measuring point only the temperature of the medium prevails. From the rise in the temperature measured by the second temperature measuring point in comparison with the temperature prevailing at the first temperature measuring point, it can then be concluded that the medium flows from the first to the second temperature measuring point. Of course this statement can only apply if the heating element produces a heat whose temperature lies above that of the medium. In this case the first temperature measuring point serves as a reference temperature measuring point in comparison with the second temperature measuring point. If the medium subsequently flows in the opposite direction, the second temperature measuring point is cooled to the temperature of the medium and simultaneously the first temperature measuring point heats up by virtue of the effect of the heat generated by the heating element, which is now transported to the first temperature measuring point. Consequently the reversal of the direction of flow of the medium can be determined from the reversal of the temperature difference between the first and second temperature measuring point which has thus occurred.

Devices of the type mentioned at the beginning are described for example in DE 44 04 395 Al, DE 43 35 332 Al and DE 40 24 827 Al. However a disadvantage of the known devices is the relatively expensive and consequently cost-intensive design and arrangement of temperature sensors, which form the temperature measuring points.

Accordingly the present invention provides a device for detecting flow of a fluid, having a temperature measuring instrument which comprises at least a first and a second temperature measuring point and a heating element, which is disposed substantially in the direction of flow of the fluid between the first and the second temperature measuring point and, wherein the temperature measuring instrument comprises a thermoelement, which consists of two wires each of a different material, each having a first end at which they are conductively connected together and each having a second end connected to an evaluation device so that the first ends form a first temperature measuring point of the thermoelement and at least one of the second ends of the thermoelement forms a second temperature measuring point. With the assistance of the arrangement specified by the invention consequently only a single thermoelement is required to produce the first and second temperature measuring points. Here the invention makes use of the realisation that in a thermoelement a thermoelectric voltage is produced if, between the first temperature measuring point of the thermoelement, at which the two wires are conductively connected to one another, and the second temperature measuring point, where the wires are "open" and and connected to the evaluation device, a thermoelectric voltage is produced if different temperatures prevail at the first end and at the second ends. In accordance with the invention the heating element is disposed between the first and second ends of the thermoelement so that the above-described effect can develop. Normally in a thermoelement the second open ends serve as a summing point, at which a known external reference temperature prevails, and the first end is determined as a measuring point at which the temperature to be measured is determined in relation to the reference temperature. However with the device specified by the invention it is not necessary to apply an external reference temperature at the second ends; instead for this purpose in dependence on the direction of flow of the medium to be detected either its normal temperature, i.e. uninfluenced by the heating element, or the temperature influenced by the heating element is used, with at the first end of the thermoelement in the first case the temperature influenced by the heating element and in the second case the normal uninfluenced temperature of the medium being detected. With the device specified by the invention it can be seen in a simple manner from the presence of the voltage drop between the first and second ends of the thermoelement that the medium to be detected is flowing. Moreover the direction of flow of the medium can be determined from the direction of the voltage drop, i.e. from the fact whether the voltage drop between the first and second ends of the thermoelement is positive or negative. Finally the amount of the voltage drop can be used to calculate the flow velocity of the medium.

Consequently with the assistance of the device specified by the invention an effective temperature measuring instrument can be produced in a constructively simple and thus cost-saving manner in order to form a flow sensor in cooperation with the heating element. This is achieved in accordance with the invention in that a normal thermoelement is used, the two ends of which act as temperature measuring points, between which the heating element is disposed. A further advantage of the solution specified by the invention lies in that the thermoelement is particularly space-saving and can consequently also be accommodated in narrow conduits.

The heating element and the temperature measuring points are preferably provided in a conduit, through which the medium flows.

A third temperature measuring point can be disposed adjacent to the second temperature measuring point, for example for redundancy reasons. With this design it is possible for the second end of the one thermoelement wire to form the second temperature measuring point and the second end of the other thermoelement to form the third temperature measuring point.

Moreover a regulating device can be provided, which regulates the energy for the heating element to a constant value. In this design the heating element is therefore supplied with a constant energy, by which a determined temperature difference is established between the first and the second temperature measuring point.

In a further development of the above-mentioned design, the heating element is disposed adjacent to the first temperature measuring point, so that the distance from the heating element to the second temperature measuring point is substantially greater than to the first temperature measuring point. If the heating element is supplied with constant energy, with the medium stationary, the first temperature measuring point heats up. If the medium subsequently begins to flow, the first temperature measuring point cools down and the second temperature measuring point heats up for a short time and thereafter remains at a higher temperature level. The time which elapses between the cooling down of the first temperature measuring point and the heating up of the second temperature measuring point is an indicator of the flow velocity and, if the medium to be measured flows through a tube, is an indicator of the quantity of flow when the tube diameter is known. If the medium subsequently flows in the opposite direction, the first temperature measuring point heats up for a short time and thereafter remains at a higher temperature level while the second temperature measuring point cools down. With the medium stationary, when the heating element Is supplied with constant energy for a certain time, the heating-up curve can be used as an indicator of the material properties and thus the quality of the medium, since different materials generally also have different thermal conductivities. If, with the medium stationary, the heating element is switched on and is then supplied with constant energy, the heating-up curve can be used as an indicator of the material property and the quality of the medium, since generally different materials possess different thermal conductivities. The same of course also applies for the case of cooling down after the heating element is switched of off. The second temperature measuring point (and where appropriate the third temperature measuring point, if provided) serves as a reference temperature measuring point.

A regulating device, which regulates the energy for the heating element to such a value that the temperature difference between the first and second temperature measuring points is kept constant, and also an energy measuring instrument, which measures the energy required for the heating element, can also be provided. With this design the second temperature measuring point may for example serve as a reference temperature measuring point, while the first temperature measuring point is kept at a constant differential temperature. The calorific output required for this is an indicator of the flow velocity and, if the medium to be measured flows through a tube, when the tube diameter is known, an indicator of the quantity of flow.

A preferred exemplified embodiment of the invention is explained below with reference to the attached FIGURE, in which the exemplified embodiment is represented diagrammatically.

The device represented in the attached figure comprises a conduit 2, through which the medium to be measured flows and inside which a temperature measuring instrument 4 is disposed.

The temperature measuring instrument 4 comprises a thermoelement 6, which consists of two wires 8, 10 of different materials. For example, the one wire 6 can be made from nickel and the other wire 10 of chrome nickel. The two thermoelement wires 8, 10, which extend in the longitudinal direction of the conduit, are conductively connected to one another at their first ends 12, on the right in the Figure, by which a first temperature measuring point P1 is formed. At their second ends 13, 14—on the left according to the figure—the two thermoelement wires 8, 10 are electrically conductively connected to an electrical connecting line 16. The thermoelement 6 is connected to an evaluation and control device 18 via the electrical connecting lines 16, which furthermore consists of ordinary copper wires. The second ends 13, 14 of the thermoelement wires 8, 10, which are not connected to one another in contrast to their first end 12, but are "open", form second and third temperature measuring points P2 and P3.

A heating element 20 is disposed between the first and second ends 12 and 13, 14 of the thermoelement 6 inside the conduit. In this case in the represented exemplified embodiment the heating element 20 sits adjacent to the first end of the thermoelement 6 and the first temperature measuring point P1 respectively, and in fact in such a manner that the distance from the heating element 20 to the second ends 13, 14 of the thermoelement 6 and second and third temperature measuring points P2 end P3 respectively is greater than the distance to the first end of the thermoelement 6 and the first temperature measuring point P1 respectively. The heating element 20, which preferably consists of a heating wire or resistor, is connected via electrical connecting lines 22 to the evaluation and control device 18.

The operation of the previously described device is explained in detail below.

The medium in the conduit 2 possesses a certain basic temperature. The heating element 20 heats the medium and the adjacent temperature measuring point P1. If the medium now flows in the direction of arrow F, the heat generated by the heating element 20 is transported to the second and third temperature measuring points P2 and P3, so that the temperature prevailing there correspondingly increases. At the same time the first temperature measuring point P1 cools down again. By the temperature difference between the first end 12 of the two thermoelement wires 8, 10 and their seconds and a thermoelectric voltage is produced, which is measured over the electrical connecting line 16 by the evaluation and control device 18, for the purpose of which a voltage measuring circuit, which is not shown in further detail, is provided in the evaluation and regulating device 18.

The evaluation and regulating device 18 may contain a regulating device, which is not shown in further detail and which regulates the energy for the heating element 20 to a constant value. In this case, when the medium is stationary, at first only the first temperature measuring point P1 heats up. If the medium then flows in the direction of arrow F, the first temperature measuring point P1 cools down and the second and third temperature measuring points P2 and P3 heat up and thereafter remain at a higher temperature level. The time which elapses between the cooling down of the first temperature measuring point P1 and the heating up of the second and third temperature measuring points P2 and P3 forms an indicator of the flow velocity of the medium and consequently, when the diameter of the conduit 2 is known, an indicator of the quantity of flow of the medium. If the medium subsequently flows in the opposite direction, i.e. in the opposite direction to arrow F, the first temperature measuring point P1 heats up and thereafter remains at a higher temperature level, whereas the second and third temperature measuring points P2 and P3 now cool down.

When the medium is stationary the heating element 20 can be supplied for a certain time with a constant energy, with the medium accordingly heating up at temperature measuring points P1 to P3. The heating-up curve can then form an indicator of the material properties and the quality of the medium respectively, since usually different materials have different thermal conductivities and thus heating-up curves. If the heating element 20 is switched off, the medium at the temperature measuring points P1 to P3 correspondingly cools down, so that the same conclusions can also be drawn from the cooling curves.

Alternatively the regulating device in the evaluation and regulating device 18 can regulate the energy for the heating element 20 to such a value that the temperature difference between the first temperature measuring point P1 on the one hand and the second and third temperature measuring points P2 and P3 on the other hand is kept constant. For this case the evaluation and regulating device 18 additionally comprises an energy measuring instrument, not represented in the drawings, which measures the energy required for the heating element 20. The calorific output required for this operation mode forms an indicator of the flow velocity and consequently, when the diameter of conduit 2 is known, an indicator of the quantity of flow.

With the described device one can establish not only the fact whether the medium is flowing or not, and the flow velocity and quantity of flow, but also the direction of flow, which results from the polarity or the thermoelectric voltage.

What is claimed is:

1. A device for detecting flow of a fluid, including a temperature measuring instrument which comprises:

a thermoelement completely provided in the flow path of the fluid and consisting of two wires, each of a different material, each wire having a first end at which they are conductively connected together, forming a first end of the thermoelement, and each wire having a second end connected, through a connecting line consisting of a material different from those of said wires, to an evaluation device so that the first end of the thermoelement forms a first temperature measuring point, second ends of the thermoelement forming a pair of a second temperature measuring point and a third temperature measuring point disposed adjacent the second temperature measuring point;

a heating element disposed substantially in a direction of flow of the fluid between the first temperature measuring point and the pair of second and third temperature measuring points; and a regulating device regulating an energy for the heating element to a constant value;

wherein upon a change in a flow velocity of the fluid the evaluation device measures a time elapsing between a cooling down of one of the first and the pair of second and third temperature measuring points and a heating up of the other of the first and the pair of second and third temperature measuring points as an indicator of the flow velocity.

2. A device according to claim 1, wherein the heating element and the temperature measuring points are provided in a conduit having a predetermined cross section area, though which conduit the fluid flows.

3. A device according to claim 2, wherein the evaluation device measures the time as an indicator of a quantity of flow.

4. A device according to claim 1, wherein a third temperature measuring point is disposed adjacent the second temperature measuring point.

5. A device according to claim 4, wherein the second end of one thermoelement wire forms the second temperature measuring point and the second end of the other thermoelement wire forms the third temperature measuring point.

6. A device according to claim 1, wherein when the fluid is stationary the evaluation device measures a heating-up curve at one or more of the temperature measuring points as an indicator of at least one material property of the fluid.

7. A device according to claim 1, wherein the heating element is disposed adjacent the first temperature measuring point, so that a distance from the heating element to the second temperature measuring point is substantially greater than a distance from the heating element to the first temperature measuring point.

8. A device for detecting flow of a fluid, including a temperature measuring instrument which comprises:

a thermoelement, which consists of two wires, each of a different material, each wire having a first end at which they are conductively connected together and each wire having a second end connected, through a connecting line consisting of a material different from those of said wires, to an evaluation device so that the first end of the thermoelement forms a first temperature measuring point of the thermoelement and at least one of the second ends of the thermoelement forms a second temperature measuring point;

a heating element, which is disposed substantially in a direction of flow of the fluid between the first and the second temperature measuring points; and a regulating device, which regulates an energy for the heating element to a constant value;

wherein upon a change in a flow velocity of the fluid the evaluation device measures the time which elapses between a cooling down of one of the first and second temperature measuring points and a heating up of the other of the first and second temperature measuring points as an indicator of the flow velocity.

9. A device according to claim 8, wherein the heating element and the temperature measuring points are provided in a conduit having a predetermined cross section area, though which conduit the fluid flows.

10. A device according to claim 9, wherein the evaluation device measures the time as an indicator of a quantity of flow.

11. A device according to claim 8, wherein a third temperature measuring point is disposed adjacent the second temperature measuring point.

12. A device according to claim 11, wherein the second end of one thermoelement wire forms the second temperature measuring point and the second end of the other thermoelement wire forms the third temperature measuring point.

13. A device according to claim 8, wherein when the fluid is stationary the evaluation device measures a heating-up curve at one or more of the temperature measuring points as an indicator of at least one material property of the fluid.

14. A device according to claim 8, wherein the heating element is disposed adjacent the first temperature measuring point, so that a distance from the heating element to the second temperature measuring point is substantially greater than a distance from the heating element to the first temperature measuring point.

* * * * *